United States Patent [19]

Mlkvy et al.

[11] 3,888,976

[45] *June 10, 1975

[54] ZINC AND STRONTIUM ION CONTAINING EFFERVESCENT MOUTHWASH TABLET

[76] Inventors: William P. Mlkvy, Hollystone Farm, R.D. No. 2, Holland, Pa. 18966; Raymond J. Tucci, 347 Saly Rd., Yardley, Pa. 19067

[ * ] Notice: The portion of the term of this patent subsequent to Nov. 13, 1990, has been disclaimed.

[22] Filed: Nov. 1, 1973

[21] Appl. No.: 411,949

Related U.S. Application Data

[63] Continuation-in-part of Ser. No. 290,914, Sept. 21, 1972, Pat. No. 3,772,431.

[52] U.S. Cl. .................................... 424/44; 424/49
[51] Int. Cl. .... A61k 9/00; A61k 11/02; A61k 11/04
[58] Field of Search ............................. 424/44, 49

[56] References Cited
UNITED STATES PATENTS

| | | | |
|---|---|---|---|
| 3,518,343 | 6/1970 | Welsh et al. | 424/44 |
| 3,629,468 | 12/1971 | Andersen | 424/44 |
| 3,772,431 | 11/1973 | Mlkvy et al. | 424/44 |

OTHER PUBLICATIONS

Brown, H. K., J. Can. Dental Assoc., 16:523–526, (1950), "Status of Dental Caries Preventive Measures in 1950."

*Primary Examiner*—Shep K. Rose
*Attorney, Agent, or Firm*—Caesar, Rivise, Bernstein & Cohen

[57] ABSTRACT

A Zinc and Strontium Ion Containing Effervescent Mouthwash Tablet comprising an effervescent couple, and a Zinc or Strontium Ion Containing astringent-desensitizing agent, flavoring, color, sweetener and other additives may be added to the basic formula.

Upon dissolution a solution is produced which gives a cleansing mouthwash effect, effective desensitizing action to the teeth, and gingival toning. This solution forms a desirable and unique basis for the addition of further agents which will aid in control of plaque, breath sweetening, anti-Microbial effect, decay prevention, water purification, and long lasting effect of all above mentioned.

4 Claims, No Drawings

ZINC AND STRONTIUM ION CONTAINING EFFERVESCENT MOUTHWASH TABLET

This application is a continuation - in - part application based on Application Ser. No. 290,914, filed Sept. 21, 1972 and entitled "Effervescent Mouthwash Tablet" now U.S. Pat. No. 3,772,431, dated Nov. 13, 1973.

This invention relates to an effervescent tablet, including a Zinc or Strontium Ion which, when dissolved in water produces a solution which makes it uniquely desirable for use as a mouthwash.

The use of mouthwashes in liquid form is well known and popular. However, for many years, the appropriation of a mouthwash from a dry powder has had appeal because it is freshly made instead of having been contained in a bottle for a long period of time. The application of this principle to an effervescent formula has surprisingly attracted little attention, although offering advantages of freshness, taste and effectiveness, as will be set forth hereinafter.

Furthermore, it has been difficult for a traveler, such as a tourist or a camper, to carry liquid mouthwash with him because of weight, fragility or bulk. Furthermore, shelf space is a problem at the retail outlet or even the home and so the provision of a number of tablets is easily preferable to a pint of liquid or the bulky sizes greater than a pint. Also, a tablet being of powder is not subject to atmospheric changes or temperature changes and would be convenient for use by the airlines or on a ship. The tablet would be useful even where the quality of drinking water is a problem since the formula can be modified to include a water purification chemical.

Effervescent tablets for producing cleaning compositions have been formulated in the past.

The concept of an effervescent tablet has been previously recognized in U.S. Pat. Nos. 1,450,865, 2,105,690, 2,540,253, 2,985,562, 2,999,293, 3,102,075, 3,105,792, 3,136,692 and 3,653,914. Also to be considered is U.S. Pat. No. 3,518,343 which introduces an anti-microbial substance into the effervescent tablet as well as a special tablet lubricant. It should be noted, however, that each of the prior arts has had as it's primary purpose avoidance of technical difficulties associated with the production and tableting of the effervescent tablet. The primary consideration was not for the development of a useful and acceptable mouthwash tablet, but of a produceable effervescent tablet with mouthwash application. The formulas in each instance produce a sweet, pleasant-tasting, colored mixture, not unlike a soda drink.

Heretofore, astringent-desentizing agents have been regarded as unacceptable because of their apparent insolubility in the presence of a carbonate or bicarbonate. These agents will be later outlined with the solution as presented by the present invention. The lack of said agents in previous effervescent mouthwash tablet formulations is most likely responsible to some degree for the noted absence of a commercially acceptable and practically useful effervescent mouthwash tablet. It is our purpose to produce an effervescent mouthwash tablet which will be not only palatable in appearance and taste, but which will have the dual role of producing an astringent mouthwash effect and desensitizing action, and which form will lend itself ideally and uniquely to the additions as outlined in our claims for long lasting plaque control, decay control, anti-microbial action, breath sweetening, whitening, and water purification.

Without this basic and necessary astringent-desensitizer, the tablet with all additives will be unappealing and therefore non-useful.

The effervescent granulation can be selected from formulations well known to those skilled in the art. The composition consists of at least one each of a solid acid and solid basic material which react to produce $CO_2$ when dissolved in water, causing the effervescence. The acid may be an organic such as fumaric, citric, tartaric, etc., or a corresponding anhydride or an inorganic, such as sulfamic or phosphonic acid derivitave as disclosed in U.S. Pat. No. 3,325,357. The basic material can be any of the metal carbonate salts such as alkali or alkaline earth carbonates and bicarbonates. Lithium, sodium, calcium carbonates or bicarbonates are examples of such materials. Certain combinations of the acids and bases are preferable to others. In the present invention, the tablet is prepared as follows:

| I. Basic Effervescent Granules: | Parts by weight |
| --- | --- |
| Citric Acid, Hydrous | 32.4 |
| Tartaric Acid | 50.4 |
| Sodium Bicarbonate | 95.4 |

Tartaric acid and sodium bicarbonate are passed through 40 mesh screen, neither are pre-heated as is usually directed. Materials blended and heated on a water bath in a porcelain evaporating dish. Mixture is stirred as it becomes moist with glass or stainless steel device (temperature about 85° C. under dish). Screen through 8 mesh screen and heat to two hours in oven at 40° C. When damp granules are dry, push through 16 mesh screen and store over silica gel or equivalent desiccant.

The astringent-desensitizing agent may be:
1. Tannic Acid and the tanin group.
2. Dilute or weak salts of the metals such as zinc chloride, stannic chloride, strontium chloride, alums, aluminum chloride and acetate.
3. Dilute organic acids such as basic acid. Examples of the foregoing are:
1. Zinc chloride and other zinc ion compounds as disclosed herein.
2. Strontium chloride and other strontium ion compounds as disclosed herein.
3. Thymol
4. Silver nitrate
5. Sodium Carbonate (anhydrous)
6. Trichloroacetic acid
7. procaine hydrochloride
8. Potassium hydroxide
9. Phenol
10. Oil of clove
11. Eugenol
12. Crissote
13. Chlorobutanol
14. Ammoniacal silver nitrate The use of strontium chloride in aqueous solution has presented difficulties in the past because the strontium chloride has a very low solubility product in prescence of carbonate and bicarbonate. The resulting precipitation would be undesirable because the insoluble precipitate would undoubtedly be available to function as an astringent-desensitizing agent and there would be further objection from an appearance standpoint.

With the present invention, it is now possible to maintain the strontium ion and/or zinc ion or vice versa in aqueous solution at a 2 to 15% by weight concentration through the use of effervescent granulation formula No. 1 that maintains a solution ph of about 5 during the course of carbon dioxide generation. Furthermore, the tablet will dissolve in water in twenty to thirty seconds to produce a clear aqueous solution that has effective astringent and desensitizing properties.

A common dental problem is that of extra sensitive teeth. When the dentin or cementum of the tooth is exposed because of faulty brushing, abrasion, gum diseases, etc., then cold, heat, sour, sweet, or pressure contacts these areas and causes discomfort. In aqueous solution the strontium ion is released. This ion appears to have a strong absorptive affinity for the organic fraction of calcified tissue (dentin and cementum). The higher the organic content the greater the absorption. The strontium ion was shown to be effective in relieving sensitivity by virtue of its apparent biocolloidal binding and blocking actions. The ions penetrate into the dentinal tubules in depth. This is consistent with the hypothesis that as the strontium ion binds with the biocolloidal of the organic matrix, an effective blockade is established to disrupt the transmission of external stimuli to the dental pulp.

|  | FORMULA A₁ | FORMULA A₂ |  |
|---|---|---|---|
| Effervescent granulation | 1.20 (grams) | 1.20 (grams) | (61.95%) |
| Granular Mannitol | 0.400 | 0.400 | (20.65%) |
| green color | 0.002 | 0.002 | (0.10%) |
| Ascorbic Acid | 0.100 | 0.100 | (5.16%) |
| Strontium Chloride | 0.040 | 0.100 | (5.16%) |
| Sodium Saccharin | 0.020 | 0.020 | (1.03%) |
| Sodium Benzoate | 0.015 | 0.015 | (0.77%) |
| Peppermint Dry Flavor | 0.100 | 0.100 | (5.16%) |
|  | 1.877 | 1.937 | (99.98%) |

|  | FORMULA B |  |
|---|---|---|
| Effervescent granulation | 1.20 (grams) | 58.97% |
| Granular Mannitol | 0.300 | 14.74% |
| Ascorbic Acid | 0.100 | 4.91% |
| Strontium Chloride | 0.300 | 14.74% |
| Sodium Saccharin | 0.020 | 0.98% |
| Sodium Benzoate | 0.015 | 0.74% |
| Peppermint Dry Flavor | 0.100 | 4.91% |
|  | 2.035 | 99.99% |

Another astringent and desensitizing agent is zinc chloride. This is especially desirable for its astringent effect, giving good gingival toning and very good feeling to the mouth after use. It also is an effective desensitizer. However, its action, rather than one of binding and blocking with the strontium ion released from the strontium chloride, is an action of cauterization of the exposed dentinal tubules. It thereby establishes an effective blockade, disrupting the transmission of external stimuli to the dental pulp. Zinc chloride may be used as the sole astringent-desensitizer or may be used in conjunction with the strontium chloride, enhancing the effect of each. When used in conjunction with each other, it shall be called as astringent-densensitizer system. In the event that it becomes difficult to work with zinc chloride, then ammonium aluminum sulfate and potassium aluminum sulfate may be utilized as alternative astringents.

The active astringent and desensitizing agent may be any one of those mentioned above or may be a combination where one has a cauterizing effect, and the other a binding effect; one enhancing the other.

It has been further determined that the astringent and desensitizing agent may be an effective amount of strontium ion, zinc ion and mixtures thereof and need not be specifically either strontium chloride or zinc chloride, although these remain the preferred compounds. For instance, it is possible to use zinc bacitracin, zinc iodate, zinc iodide, zinc sulfate, zinc glucinate and zinc acitate. Strontium salts usable within the scope of the invention are strontium iodide, strontium nitrate, strontium lactate and strontium acitate. Tests involving certain of the foregoing are now set forth.

FORMULA C

| INGREDIENT | WGT. PER TABLET | % |
|---|---|---|
| Basic Effervescent Gran. | 1.200 g. | 51.0 |
| Granular Mannitol | 0.392 | 16.7 |
| Turquoise Green | 0.008 | 0.3 |
| Zinc Sulfate | 0.300 | 12.7 |
| Strontium Chloride | 0.300 | 12.7 |
| Menthol (or Thymol-ET2-HV) | 0.300 | 1.3 |
| Sodium Saccharin | 0.010 | 0.4 |
| Sodium Benzoate | 0.015 | 0.6 |
| Spray Dried Flavor, Peppermint | 0.100 | 4.2 |
|  | 2.355 | 99.9% |

FORMULA D

| INGREDIENT | WGT. PER TABLET | % |
|---|---|---|
| Basic Effervescent Granulation | 1.200 g. | 49.5 |
| Granular Mannitol | 0.392 | 16.2 |
| Turquoise Green | 0.008 | .3 |
| Zinc Gluconate | 0.400 | 16.5 |
| Strontium Chloride | 0.300 | 12.4 |
| Sodium Saccharin | 0.010 | .4 |
| Sodium Benzoate | 0.015 | .6 |
| Spray Dried Flavor, Peppermint | 0.100 | 4.1 |
|  | 2.425 g. | 100.0 % |

FORMULA E

Identical with Formula D except Zinc Acetate 0.400 g. replaces Zinc Gluconate. This formula gives an acceptable solution but the tablets would be very difficult to make due to the hygroscopicity of Zinc Acetate.

FORMULA F

Identical to Formula D except that Zinc Nitrate 0.300 g replaces Zinc gluconate.

FORMULA G

| INGREDIENT | WGT. PER TABLET | % |
| --- | --- | --- |
| Basic Effervescent Granulation | 1.200 g. | 56.5 |
| Granular Mannitol | 0.392 | 18.4 |
| Turquoise Green | 0.008 | .4 |
| Strontium Lactate | 0.100 | 4.7 |
| Zinc Sulfate | 0.300 | 14.1 |
| Sodium Saccharin | 0.010 | 0.5 |
| Sodium Benzoate | 0.015 | 0.7 |
| Spray Dried Flavor, Clove Oil | 0.100 | 4.7 |
| | 2.125 g. | 100.00 |

FORMULA H

Identical to Formula G except that Strontium acetate 0.100 g replaces Strontium Lactate.

It must be kept in mind that in using acceptable compounds, including the zinc and strontium ion, that special consideration must be given ph, concentration, achievement of sharp astringent taste, the provision of a clear solution, non-toxicity and the prevention of caries.

Desensitizing agents have been used in toothpaste form. The value of these agents in an effervescent mouthwash form is evident. The act of brushing and the paste itself act as abrasives. A mouthwash is gentle, non-abrasive, and in effervescent tablet form has the added advantage of being easily used in situations where toothbrushing and carrying of a liquid mouthwash would be impractical. This is an important consideration as the effect of the desensitizer is cumulative. In actual preparation of the effervescent mouthwash tablet it would be important to incorporate certain other substances which would greatly add to the value of the tablet to the consumer. However it is felt that without the basis of the present invention as stated, these additional substances would not be acceptable in effervescent mouthwash tablet form.

In actual preparation, consideration has been given to the use of an anti-microbial agent.

The invention contemplates additional active ingredients, but this is by way of the more specific aspects of the invention. The invention as previously described in itself constitutes an effective mouthwash tablet, but the ingredients to be discussed hereinafter contribute other desirable properties and so will be incorporated many times in the basic formula. These additional ingredients include an anti-microbial agent, an adherent, a chelating agent and Vitamin C as well as the usual tablet lubricants.

The preferred anti-microbial agent is cetyldimethylbenzylammonium chloride. Many anti-microbial agents may be used, including phenol and its homologs and derivatives such as alkyl phenols, halogenated phenols, polyhydric phenols and a diphenyl and similar aryl derivatives. Other anti-microbial substances are set forth in U.S. Pat. No. 3,518,343 and such substances, as specifically mentioned in columns 4 and 5 of said patent, and elsewhere throughout said patent, are expressly incorporated herein by reference.

However, with the present invention it has been discovered that the use of anti-microbial agent is not enough to launch an effective attack into tooth decay and the mechanism which causes tooth decay.

A prime cause of tooth decay is believed to occur with the formation of mucin which is an albuninoid substance found in the mouth. Mucin acts as a binding material to hold bacteria, calcium and food debris together in a mass that is collectively referred to as plaque. Mucin is insoluble in water, but is precipitated by Vitamin C. With the precipitation of mucin, in conjunction with the present invention, a synergistic effect is achieved by virtue of the anti-microbial agent and the chelating agent of the present invention.

The present invention contemplates the action of Vitamin C, which when present in sufficient quantities, will cut the mucin and this will have a significant effect in minimizing the amount of mucin that remains active to create plaque. The chelating agent will hold calcium ions in solution and retard the deposition of calcium ions in the remaining plaque, as allowed by the minimal amount of mucin. Finally, the anti-microbial agent will deprive whatever plaque is formed of any significant bacteria value, thus further deactivating the plaque and tending to defeat the formation of calculus which leads to tooth decay.

In addition, the bubbling effect produced by the effervescent granulation formula has a value in removal of plaque debris, and also stimulates the blood circulation of the oral mucosa.

Yet another important substance to be added in the actual preparation of the present invention is the use of an adherent, such as sodium benzoate, benzoic acid or polyox WSR-301, a resinous adherent. The presence of the adherent enables the entire formula to have long lasting properties. The adherent is a water soluble agent that acts as a vehicle for the active components of the formula, with the adherent in its adhering effectiveness tending to form a film on the teeth that is not readily soluble in water or saliva. Thus, such a film will persist for a considerable time, thereby holding the active ingredients in continuing contact with the teeth. This further aids in the destruction of mucin and the prevention of formation of plaque.

A chelating agent will sequester calcium in solution, without any damage to enamel, and permit it to be washed away with the effervescent formulation, thereby preventing continuing build-up of dental plaque, the primary cause of tooth decay. Preferred chelating agents are EDTA disodium dihydrogent ethylenediaminetetraacetate and the calcium chelate of disodium ethylenediaminetetraacetic acid.

Finally, it may be aesthetically desirable to add an optical whitener to the basic formula. Also, a fluoride and a water purification chemical can be added.

It is felt that these particular additives made practical through the use of the present invention, will be of inestimable value in the art of preventive dentistry. Whereas the dentist has always encouraged people to at least rinse the mouth with water, if brushing is not possible after food consumption, a palatable, astringent-effervescent mouthwash tablet makes this now possible and practical, with the added health benefits as stated.

The other components of the various formulae of said U.S. Pat. No. 3,518,343 are also incorporated herein by reference to the extent consistent with the present invention, including the tabletting and other manufacturing techniques, as well as the compaction of the tablet and the finished tablet size.

The foregoing as well as other objects of the invention are achieved by providing a balanced formula of an effervescent mouthwash tablet that can be readily formulated and compressed into tablet form by well known machinery. The product is believed to possess a long shelf life and will consistently provide an aqueous solution of good color and taste as well as clarity.

A mouthwash with plaque control agent has the following formulation:

(FORMULA NO. 1)

|  | LOWER | PER TABLET |  | UPPER |
|---|---|---|---|---|
| Effervescent granulation (No. 2) |  | 1.200 g | (59.14%) |  |
| Mannitol granular (20 mesh tabletting atent) | 0.200 g | 0.400 g | (19.72%) | 0.600 g |
| Ascorbic Acid (Vitamin C) | 0.050 g | 0.100 g | (4.93%) | 0.200 g |
| Zinc Chloride (Desensitizing) | 0.050 g | 0.150 g | (7.39%) | 0.300 g |
| Sodium Saccharin | 0.005 g | 0.010 g | (0.49%) | 0.040 g |
| Sodium Benzoate (100 mesh adherent) | 0.005 g | 0.015 g | (0.74%) | 0.020 |
| Verdant Green MX 135 |  | 0.004 g | (0.20%) |  |
| Peppermint Dry Flavor |  | 0.150 g | (7.39%) |  |
|  |  |  | 100.00% |  |

Another formula for use in the present invention possesses the following constituent elements:

|  | LOWER | PER TABLET |  | UPPER |
|---|---|---|---|---|
| Effervescent granulation (No. 2) |  | 1.200 g | (62.047%) |  |
| Mannitol Granular (20 mesh) | 0.200 g | 0.400 g | (20.683%) | 0.600 g |
| Ascorbic Acid (Vitamin C) | 0.050 | 0.100 g | (5.171%) | 0.200 g |
| Cetyldimethylbenzyl-ammonium chloride | 0.010 | 0.040 | (2.069%) | 0.060 g |
| Sodium Saccharin | 0.005 g | 0.010 g | (0.518%) | 0.040 g |
| Polyox WSR-301 (resinous adherent) | 0.010 g | 0.030 g | (1.552%) | 0.050 g |
| Versene CA (Calcium Disodium EDTA) |  | 0.0001 g | (0.005%) |  |
| Verdent Green MX 135 |  | 0.004 g | (0.208%) |  |
| Peppermint Dry Flavor |  | 0.150 g | (7.757%) |  |
|  |  |  | 100.000%. |  |

A mouthwash tablet with resinous adherent for long lasting flavor has the following formulation:

|  | LOWER | PER TABLET |  | UPPER |
|---|---|---|---|---|
| Effervescent granulation (No. 2) |  | 1.200 g | (58.71%) |  |
| Mannitol granular (20mesh) | 0.200 g | 0.400 g | (19.57%) | 0.600 g |
| Ascorbic Acid (Vitamin C) | 0.050 g | 0.100 g | (4.89%) | 0.200 g |
| Zinc chloride (Desensitizing) | 0.050 g | 0.150 g | (7.34%) | 0.300 g |
| Sodium Saccharin | 0.005 g | 0.010 g | (0.49%) | 0.040 g |
| Polyox WSR-301 (resinous Adherent) | 0.010 | 0.030 g | (1.47%) | 0.050 |
| Verdant Green MX 135 |  | 0.004 g | (0.20%) |  |
| Peppermint Dry Flavor |  | 0.150 g | (7.33%) |  |
|  |  |  | 100.00% |  |

Another mouthwash tablet utilizing zinc chloride has the following formulation:

| Effervescent granulation | 1.200 g |
| Granular Mannitol | 0.400 |
| Turquois Green | 0.002 |
| Ascorbic Acid | 0.100 |
| Zinc Chloride | 0.150 |
| Sodium Saccharin | 0.020 |
| Sodium Benzoate | 0.015 |
| Peppermint Dry Flavor | 0.100 |

The use of sweeteners and flavoring agents is well known to those skilled in the art and the relative amounts may be adjusted to taste. Sodium saccharin may be used up to one per cent by weight. Flavoring agents, such as peppermint and cinnamon, may be used in amounts be weight ranging from 0.2 to 5 per cent by weight.

The adherent is preferably present in an amount by weight ranging from 0.25 to 4%.

Vitamin C is preferably present in an amount by weight ranging from 1 to 12%.

The chelating agent is preferably present in an amount by weight ranging from 0.001% to 0.010%.

The anti-microbial agent is preferably present in an amount by weight ranging from 0.5 to 4%.

The desensitizing agent is preferably present in an amount by weight ranging from 1 to 15%.

The effervescent agent is preferably present in an amount by weight ranging from 40% to 80%.

It is also contemplated that a fluorescent whitener be added to the overall formula in an amount not to exceed one per cent by weight.

The present invention further contemplates the inclusion of Vitamin E.

What is claimed as the invention is:

1. An effervescent mouthwash tablet comprising an effervescent couple consisting of at least one each of a solid pharmaceutically acceptable acid and a solid pharmaceutically acceptable base material, which effervescent couple reacts to produce carbon dioxide when dissolved in water causing effervescence, and an effective amount of strontium ion, zinc ion and mixtures thereof as an astringent-desensitizing agent.

2. The tablet of claim 1 wherein said astringent and desensitizing agent is strontium chloride.

3. The tablet of claim 1 wherein said astringent and desensitizing agent is zinc chloride.

4. An effervescent reaction product produced when the tablet of claim 1 is dissolved in water, said product having a pH of about 5.

* * * * *